Feb. 3, 1970  D. L. FRIED ET AL  3,493,293
LIGHT BEAM STEERING DEVICE
Filed Nov. 22, 1966  3 Sheets-Sheet 1

INVENTORS
DAVID L. FRIED
JOEL B. SEIDMAN
BY
ATTORNEY

Feb. 3, 1970   D. L. FRIED ET AL   3,493,293
LIGHT BEAM STEERING DEVICE
Filed Nov. 22, 1966   3 Sheets-Sheet 3

*INVENTORS*
DAVID L. FRIED
JOEL B. SEIDMAN
BY

*ATTORNEY*

United States Patent Office

3,493,293
Patented Feb. 3, 1970

3,493,293
LIGHT BEAM STEERING DEVICE
David L. Fried, Woodland Hills, and Joel B. Seidman, Los Angeles, Calif., assignors to North American Rockwell Corporation, a corporation of Delaware
Filed Nov. 22, 1966, Ser. No. 596,315
Int. Cl. G02f 1/34
U.S. Cl. 350—285                                12 Claims

ABSTRACT OF THE DISCLOSURE

A device for increasing the observed angle of incidence of a reflected light ray in one plane by multiple reflections thereof in a plane normal to the plane of the angle-to-be-observed. A preferred embodiment of the multiple reflective beam steering device comprising a spherical concave focusing means having a radial extraction slit defining said plane of the angle-to-be-observed and a pair of small rotatable reflective surfaces at conjugate focal points of the spherical means.

---

The angular steering of a light beam is frequently desired for instrumentation purposes, and has been accomplished in the past by means of a mirror attached to a rotatable galvanometer element and suspended within the illumination of a collimated light source. The limit of the angular resolution obtainable by such an arrangement is determined by the resolution of the reflected optical image. Attempts to improve such angular resolution have involved reflective systems, employing a plurality of reflective elements, whereby the incident angle is augmented upon each subsequent reflection. However, the effects of diffraction spreading of the reflected light image upon each subsequent reflection may limit the accuracy and resolution of these multiple-reflective light beam steering devices. In other words, the number of multiple reflections which may be usefully employed is limited to that number for which diffraction spreading of the reflected image becomes objectionable. Although such effect may be lessened by employing a light beam having a large diameter or by increasing the angular scanning range of the rotatable driving element, such design approaches tend to increase the size and inertia of the beam steering device, and hence reduce the speed at which it may be driven.

By means of the concept of the subject invention, the above noted shortcomings of the prior art are avoided and means is provided for multiple reflection of a light beam many hundreds of times to effect multiplication of a scanning angle many hundreds of times by means of a minimum of optical elements, whereby the angular scanning range of a reflective type beam steerer is increased without reducing the angular speed thereof.

In a preferred embodiment of the invention there is provided a multiple reflective beam steering device comprising a spherical concave focusing means and a pair of small reflective surfaces at conjugate focal points of the spherical focussing means, the axis of symmetry of one of the mirrors being slightly mutually angled relative to that of the second one of the mirrors. Scanning is effected by rotation of at least one of the pair of mirrors about an axis of rotation parallel to a plane in which said mirrors are mutually angled. A radial extraction slit in the spherical focussing means, oriented in a plane mutually perpendicular to the plane in which the mirror pair are mutually angled, allows extraction or projection of the reflectively multiplied scanning angle of an injected incident light beam.

The number of multiple reflections which may be effectively employed in the above described arrangement is limited by the size of the light beam image employed and the diffraction spreading thereof, while the number of successive reflections actually obtained is determined by the offset angle between the mutually angled pair of reflecting surfaces. By means of a narrow light beam source and the refocussing effect of the spherical mirror the effect of diffraction spreading is reduced, whereby a larger number of multiple reflections may be employed. Such increased number of reflections is obtained by reducing the angular offset between the pair of mutually angled reflecting surfaces.

Accordingly, it is an object of the subject invention to provide improved light-beam steering apparatus.

It is another object of the invention to provide multiple-reflective light-beam steering apparatus employing a minimum of optical elements.

It is still another object of the invention to provide a multiple reflective beam steerer having an increased angular range.

A further object of the invention is to provide means for increasing the angular range of a light-beam steerer without reducing the scanning speed thereof.

These and other objects of the invention will become apparent from the following description, taken together with the accompanying drawings in which.

Figure 1:
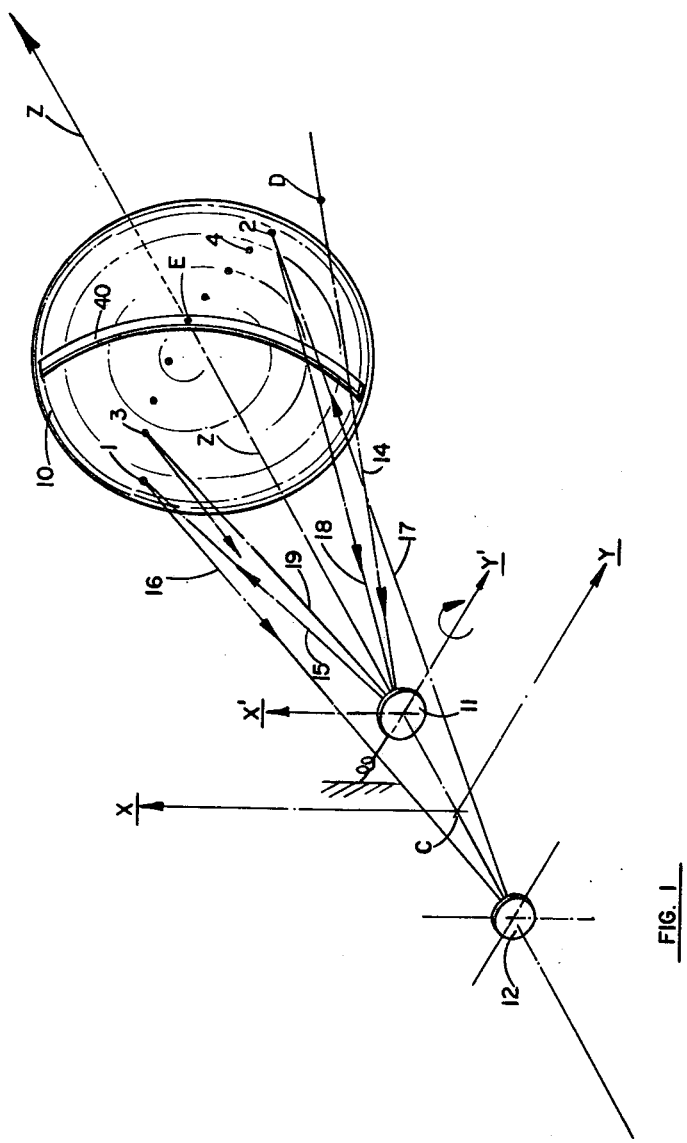
FIG. 1 is a schematic arrangement of a system embodying the concept of the invention.
Figure 4:
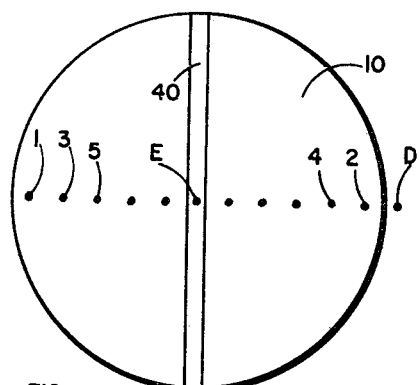
Figure 5:
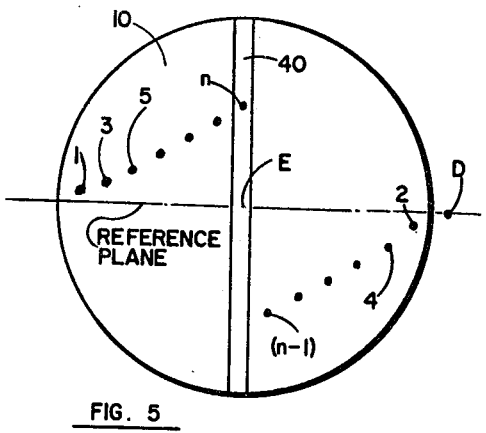
Figure 6:
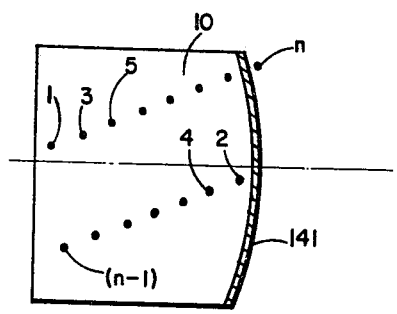

FIG. 4 is a front view of the spherical focussing means and extraction slit, illustrating the pattern of focussed images obtained for the reference geometry situation of FIG. 1, and FIGS. 5 and 6 are front views of alternate arrangements for the extraction slit of FIG. 1, illustrating the pattern of focussed images obtained for an exemplary angular displacement of the mirror pair about an axis parallel to the respective planes of FIGS. 5 and 6 and normal to the extraction slit.

In the figures, like reference characters refers to like parts.

Referring now to FIG. 1, there is illustrated a schematic arrangement of a system embodying the concept of the invention. There is provided spherical focussing means comprising a spherical concave mirror 10 having a center of curvature C. Such center also represents the center of a coordinate system of three mutually orthogonal axes, a first one of which extends through such point and the center of spherical mirror 10. A pair of small reflecting surfaces 11 and 12 are located at stations representing conjugate foci of focussing means 10. A first mirror 11 of the pair of mirrors 11 and 12 serves as an injection mirror for a source (not shown) of a collimated, light beam located at an edge D of focussing means 10 and directed at mirror 11. Such light beam is preferably diffraction limited (such as that provided by a laser device, for example). Such beam at D may be obtained by focussing the source to a diffraction limited spot.

Figure 2:
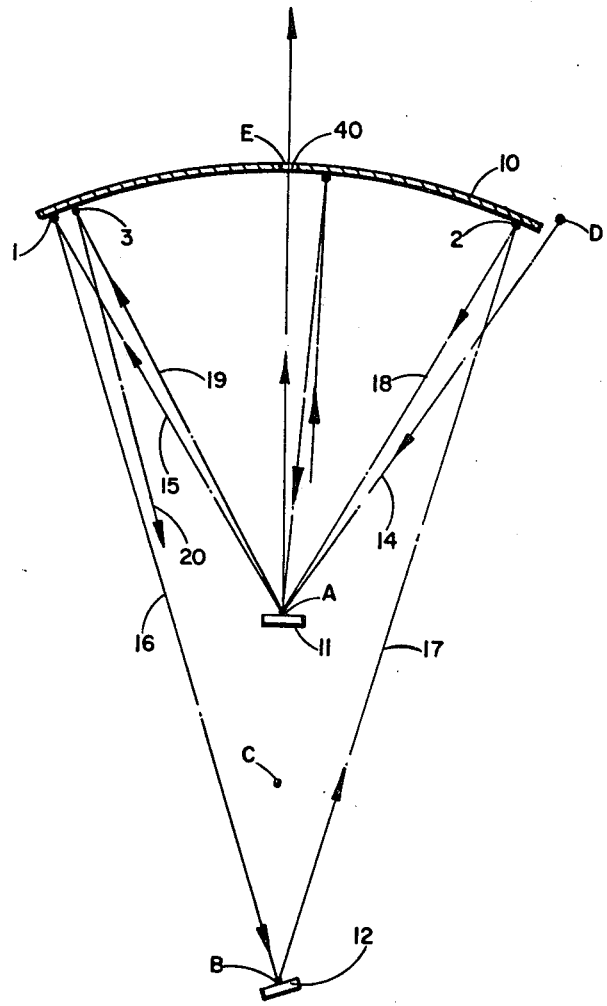
FIG. 2 is a plan view of the geometry of FIG. 1, illustrating the multiple-reflective optics thereof.

The center of such light beam and the first axis Z, of the above-noted coordinate system, define a plane which contains an angle by which an optical axis of symmetry or normal of one of the pair of mirrors 11 and 12 is slightly angularly offset, relative to that of the other of the two mirrors, as is shown, exaggerated in effect, in FIG. 2. The purpose of such mutually angled relationship between the pair of mirrors 11 and 12 is to provide a multiple reflective optical system, in cooperation with spherical mirror 10, as may be more clearly seen from FIG. 2.

Referring to FIG. 2, there is illustrated a plan view or center section taken along the central axis Z of spherical mirror 10 of FIG. 1. The reflection of incident ray 14 from injection mirror 11 as reflected ray 15, results in a focussed image on spherical mirror 10 at point 1. The reflection of ray 15 from point 1 on mirror 10 occurs as ray 16 at B, the conjugate of focal point A, due to the displacement of point A from the center of curvature C, shown in the exemplary arrangement of FIGS. 1 and 2 as an axial displacement. The second small mirror 12 of the miror pair, is slightly angularly inclined in an azimuthal direction opposite that of light source location D. Alternatively, mirror 11 (at A) may be slightly inclined toward D. In this way, the light beam from D (at an edge of spherical mirror 10) may be made to follow a series of paths: to mirror 11, thence toward the opposite edge of spherical mirror 10, to mirror 12, and thence as reflected ray 17 to spot 2 toward the first edge on spherical mirror 10.

The reflection of ray 17 from spot 2 as ray 18 occurs as an image on mirror 11 at point A, the conjugate of point B, due to the axial displacement of point B from the center of curvature C. Hence, the reflected light ray from point 2 to mirror 11 will traverse a similar, but angularly displaced, path as before. The second reflected beam from mirror 11 (ray 19) is focussed as a third spot 3 inside, or to the left of, spot 1 on spherical mirror 10 and is then reflected as ray 20 toward mirror 12, similarly as was explained in connection with the description of rays 15 and 16.

Because of the optical geometry of the cooperation of mirror 12 with spherical mirror 10, and the narrower subtended angle between incident and reflected rays thereof, relative to the subtended angle between corresponding pairs of incident and reflected rays of injection mirror 11, successive sets of reflections between spherical mirror 10 and injection mirror 11 will subtend successively smaller angles. In other words, image spots are focussed on mirror 10 alternately on opposite sides thereof, with successive images being formed progressively toward the center E of the mirror 10. For example, the subtended azimuth angle in FIG. 2 between rays 16 and 17 is less than that between rays 14 and 15, and results in a subtended angle between rays 18 and 19 which is less than that between 14 and 15.

At the center E of mirror 10 of FIG. 1 is a radial extraction slit 40 oriented substantially perpendicularly to the plane formed by axis Z and point D (e.g., oriented vertically), for extraction of that one of the reflected rays intercepted within such slot. Where the axis of symmetry or normal of each of mirrors 11 and 12 is parallel to the plane defined by axis Z and point D, such extraction occurs at an elevation angle of zero, or in a horizontal plane containing the Z axis of spherical mirror 10, as may be seen more clearly in the front view of mirror 10 shown in FIG. 4. Such reference orientation is indicated in FIG. 4 by the array of focussed images in a horizontal radial line across the face of mirror 10.

Uniplanar light-beam steering or scanning, with scan-angle multiplication, is effected by tilting or rotating at least one of the pair of mirrors 11 and 12 of FIG. 1 about an axis mutually orthogonal with the main axis Z of mirror 10 and lying within the (horizontal) reference plane defined in FIG. 1 by axis Z and point D. (If both of elements 11 and 12 are tilted, then they must be tilted oppositely.) Where injection mirror 11, for example, is tilted through an elevation angle, such elevation angle will induce a corresponding change in the elevation component of the angle of incidence of incident ray 14 relative to a normal of injection mirror 11, producing a corresponding change in the elevation angle of ray 15, as may be more readily appreciated from the side view or vertical section in FIG. 3, taken parallel to the central axis Z of spherical lense 10 of FIG. 1.

Figure 3:
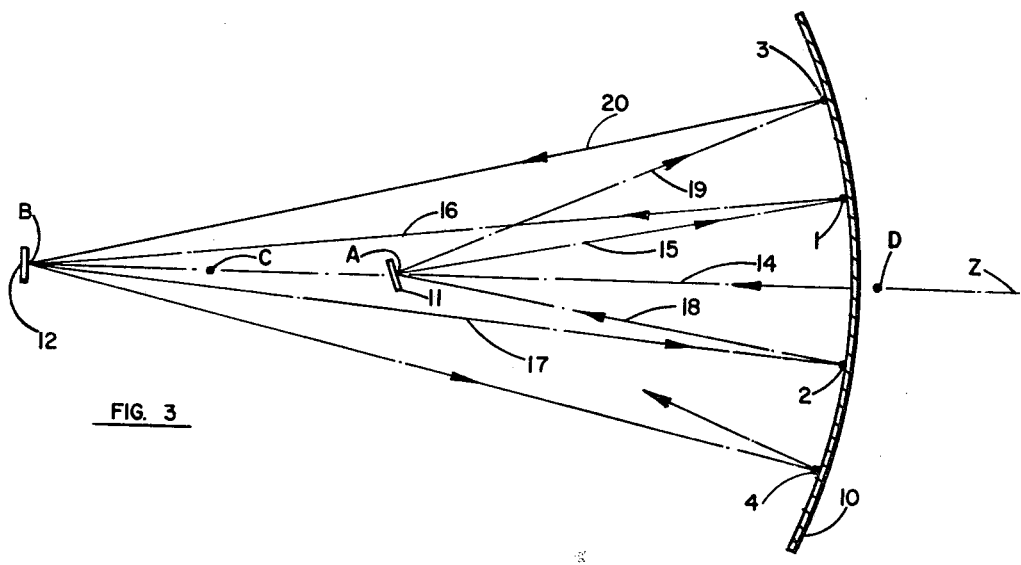
FIG. 3 is a view of elevation illustrating the angle-multiplication achieved normal to the plane of FIG. 2 by means of the multiple-reflection means of FIGS. 1 and 2.

Ray-tracing of the optics geometry in the elevation view of FIG. 3, for the tilting in elevation of injection mirror 11, may be undertaken similarly as was done for the mutually azimuthally-angled mirrors 11 and 12 in the plan view of FIG. 2. Several differences of significance occur between the plane view of FIG. 2 and side view of FIG. 3 due to the fact that point D (the location of the collimated light source) and ray 14 both lie within the horizontal plane containing the reference axis Z of spherical mirror 10. If injection mirror 11 (in FIG. 3) is oriented in elevation with a normal thereof parallel to the horizontal Z axis of spherical mirror 10, then the reflected ray 15, resulting from incident ray 14 and striking mirror 11 (and corresponding to reflected ray 15 of FIGS. 1 and 2) would similarly lie in the horizontal plane containing ray 14; and all subsequently reflected rays resulting from the multiple reflective arrangement of FIG. 1 would similarly lie in such reference plane, as shown in FIG. 4.

Upon the tilting of at least injection mirror 11 through a given elevation angle, shown with exaggeration in FIG. 3, the first reflected ray 15 is rotated by twice such angle, as is well understood in the art, resulting in a vertical displacement of image 1 upon the face of spherical mirror 10. Image 1 is reflected as ray 16 toward mirror 12 at point B (the conjugate of focus point A) due to the axial displacement of mirror 11 and point A from the center of curvature C of spherical mirror 10. The reflection of ray 16 from miror 12 occurs as ray 17, producing image 2, on the side of axis Z opposite that of image point 1. The reflection ray 17 from image point 2 as ray 18 strikes injection mirror 11 and is re-reflected as ray 19, which produces image point 3, above point 1.

Because point 2 occurs below the reference level of point D (in FIG. 3), the vertical angle subtended by rays 18 and 19 (at injection mirror 11) is larger than that subtended by rays 14 and 15. Hence, in response to a tilting of injection mirror 11 in elevation, successive sets of reflections between spherical mirror 10 and injection mirror 11 will subtend successively greater angles. In other words, image spots are focussed on mirror 10 alternately on opposite sides thereof, with successive images being formed progressively toward the peripheral edges of mirror 10, and away from the horizontal reference plane thereof, as shown more particularly in FIG. 5. Hence, the emergent ray or projected image ($n$) through extraction slit 40 will be displaced from the reference plane by an amount representing the vertical angular displacement of ray 15 (FIG. 3) multiplied by the number ($n$) of multiple reflection images occurring on either side of (above or below) the reference plane.

Although beam extraction means 40 in FIGS. 1, 2, 4 and 5 has been described in terms of a slot or physical opening in spherical lens 10, the beam extraction means E is not limited to such form and, alternatively, may comprise a planar reflecting surface or flat reflective strip angularly oriented for projecting the intelligence or displacement scanning information to a display device or other means for utilizing such information. Upon the extraction of a given one ($n$) of a number of successive images, further image multiplication is prevented by the disclosed reflective optical scheme of FIGS. 1, 2, 4 and 5. In other words, the last reflected image is ($n-1$).

A further alternative for such extraction silt contemplates a vertical edge comprising an arc of a great circle of a truncated spherical mirror, as shown by the vertical edge in FIG. 6. Such configuration, which corresponds slit 40 of FIG. 1 being displaced from the center of mirror 10 of FIG. 1, does not interrupt the succession of reflections across the face of mirror 10, thereby allowing or resulting in a greater number of usable reflections for a given horizontal dimension of the mirror aperture, and a corresponding increase in the angular multiplication achieved. Because such alternate extraction silt is a great circle on the spherical concave surface of facussing means 10, the vertical plane thereof contains vertical axis X (of FIG. 1) as well as being perpendicular to horizontal axis Y (in FIG. 1).

Only a very limited amount of multiple-reflection has been indicated in the exemplary diagrams of FIGS. 2, 3, 4, 5 and 6, for a relatively large or exaggerated azimuthal offset angle and similarly exaggerated elevational tile angle. It is to be understood that such exaggerated geometry has been employed for convenience only in the exposition of the inventive concept, and that multiple reflections of many hundreds are employed, with an associated increase in the range of output scanning angle.

The number of multiple reflections and the associated azimuth angle dimension from center-to-center of adjacent images on mirror 10 are functions of the azimuthal offset between the pair of mirrors 11 and 12. Such dimension is selected to be slightly smaller than the width or narrow dimension of extraction slot 40, in order to allow a cleaner extraction of improved resolution (e.g., no more than two laterally adjacent images, and preferably only one image, being projected at either of the upper and lower extraction points). Hence, the smaller the width of slot 40, the smaller the azimuth offset between mirrors 11 and 12, the greater the number of multiple reflections, and the larger the degree of angular multiplication. The limit of the minimum practical dimension of slot 40, of course, is determined by the size of the focussed image projected therethrough. In other words, $$a+d<b<c$$

where:
- $a$ = image dimension
- $b$ = center-to-center horizontal dimension between adjacent images
- $c$ = extraction slot width
- $d$ = raggedness of the extraction slot dimension As is well understood in the optical art, the successive projection of a point source optical image of a diffraction limited point source by either a transmissive lens or reflective lens is accompanied by a spreading of the image due to diffraction of a converging spherical wave front. Such phenomenon, giving rise to an Airy pattern, is described, for example, in Section 11–8 of "Geometrical and Physical Optics" by Longhurst, published by Longmans, Green and Co., Inc., of New York, New York (1957). By limiting the amount of such diffraction spreading occurring for each reflection from the mirrors 11 and 12 (of FIG. 1), smaller images are provided on mirror 10, and hence an increased number of multiple reflections may be effectively employed in reducing the azimuthal offset between injection mirror 11 and the second mirror 12 of the mirrors, as well as providing more resolution elements (or spot images) in the scanning ranges. Such effect may be achieved by employing diffraction limited spherical surfaces for the mirrors 11 and 12.

The one embodiment of the device, which has been successfully built and operated to illustrate the inventive concept for a monochromatic light source of 6,328 angstroms, a spherical mirror having a diameter of four inches and a center of curvature of 16 inches has been employed in cooperation with a pair of mirrors, each of about ⅛ inch diameter and located at a respective one of conjugate foci situated axially ⅛ inch on either side of the center of curvature of the spherical mirror.

Although an embodiment of the inventive device has been described in terms of a horizontal orientation with the mirror pair mutually oriented in azimuth, it is clear that the device may be employed in any orientation without departing from the inventive concept. Also, although the pair of small mirrors 11 and 12 of FIG. 1 have not been described as having any particular curvature, and although flat reflective surfaces may be employed, it has been found preferable to employ spherical reflecting surfaces for the mirrors 11 and 12, the radii of curvature of which being substantially the same as that of the principal spherical reflecting mirror 10.

What has been disclosed is multiple reflective means in which the number of multiple reflections of a light beam is controlled by an angular position or offset in one of two mutually orthogonal directions, while permitting the angular position to be varied in the other of the two mutually orthogonal directions without affecting the control of the number of reflections.

Further, although the focussing means 10 has been described in terms of a spherical concave mirror, it is apparent that a spherical lens may be alternatively employed, with one of mirrors 11 and 12 located at a corresponding one of conjugate foci at opposite focal points of such spherical lens. Such latter configuration, while functionally equivalent to the mirror type focussing means of FIG. 1, occupies a longer axial dimension and corresponding volume, and for such reason may not be preferred.

It is to be appreciated, therefore, that uniplanar light-beam steering means have been disclosed, which employs a minimum number of optical elements and provides a maximum degree of multiple reflectivity and scan-angle multiplication. Because maximum multiple reflection is effected with a minimum number of optical elements, an improved range of scan-angles may be achieved without a reduction in scanning speed. Accordingly, improved light beam steering apparatus has been described.

Although the invention has been illustrated and described in detail, it is to be clearly understood that the same is by way of illustration and example only and is not to be taken by way of limitation, the spirit and scope of this invention being limited only by the terms of the appended claims.

We claim:

1. A device for increasing the observed angle of incidence of a reflected light ray in one plane by multiple reflections thereof in a plane normal to the plane of the angle to be observed and comprising spherical focussing optics having at least one center of curvature lying on a first of thre mutually orthogonal axes and further having a narrow radial slit therein lying in a plane containing a second one of said mutually orthogonal axes; and a pair of reflecting surfaces, each having an area substantially less than that of said spherical focussing optics, said pair of reflecting surfaces being located in front of and facing said focussing optics and proximate said first one of said mutually orthogonal axes, each of said pair of surfaces being located at a mutually exclusive one of conjugate foci points about a center of curvature of said focussing optics, at least one of said pair of surfaces being oriented about an axis parallel to said second one of said mutually orthogonal axis by an amount corresponding to the parallax between said air of mirrors presented at the edge of said focussing optics in a plane containing said first and a third one of said mutually orthogonal axes, and at least one of said pair of surfaces being adapted for rotation about an axis perpendicular to said first and second ones of said mutually axes, said rotation corresponding to an angle to be multiplied.

2. A device for increasing the observed angle of incidence of a reflected light ray in one plane by multiple reflections thereof in a plane normal to the plane of the angle to be observed and comprising a spherical concave reflecting surface having a center of curvature lying on a first of three mutually orthogonal axes and further having a narrow extraction slit therein lying in a plane containing a second one of said mutually orthogonal axes;

a pair of reflecting surfaces, each having an area substantially less than that of said spherical surface, said pair of reflecting surfaces being located in front of and facing said spherical surface and proximate said first one of said mutually orthogonal axes, each of said pair of surfaces located at a mutually exclusive one of conjugate foci points about said center of curvature;

at least one of said pair of surfaces being oriented about an axis parallel to said second one of said mutually orthogonal axes by an amount corresponding to the parallax between said pair of mirrors presented at an edge of said spherical surface in a plane containing said first and a third one of said mutually orthogonal axes; and at least one of said pair of surfaces being adapted for rotation about an axis perpendicular to said first and second ones of said mutually orthogonal axes, said rotation corresponding to an angle to be multiplied.

3. The device of claim 2 in which said plane containing said extraction slit further contains said first one of said mutually orthogonal axes and corresponds to said plane of said angle to be observed.

4. A device for multiplying the observed angle of incidence of a reflected light ray by multiple reflections thereof, comprising a spherical optical focussing means having a center of curvature lying on one of three mutually orthogonal axes; and a pair of reflecting means in cooperation with said focussing means for effecting multiple reflection of an incident light beam directed at one of said pair of reflecting means, each one of said pair having an area substantially less than that of said focussing means, an optical axis of symmetry of each of said pair of reflecting surfaces being mutually angled in a plane containing said first and a second one of said mutually orthogonal axes, at least one of said pair of reflection surfaces being rotatably mounted for rotation about an axis parallel to said second one of said mutually orthogonal axes, said rotation corresponding to the observed angle, said focussing means having a radial exit slit lying in a plane mutually orthogonal to said first and a third one of said mutually orthogonal axes for projection of a reflected light beam at a multiplied angle.

5. The device of claim 4 in which there is further provided a source of collimated monochromatic light for injection into the multiple reflective optics thereof, and in which each of said pair of reflective surfaces is diffraction limited in relation to said focussing means.

6. The device of claim 5 in which said light source is oriented and positioned to inject said light in a plane containing said first mentioned axis and mutually orthogonal to the plane containing said extraction slit.

7. The device of claim 4 in which there is further provided a diffraction limited source of light for injection into the multiple reflective optics thereof in a plane containing said first mentioned axis and mutually orthogonal to the plane containing said extraction slit.

8. The device of claim 4 in which each of said pair of reflective surfaces is diffraction limited in relation to said focussing means.

9. The device of claim 4 in which the curvature of each of said pair of reflective surfaces is spherical.

10. The device of claim 9 in which each of said spherical mirrors is diffraction limited in relation to said focussing means.

11. The device of claim 9 in which the radius of curvature of each of said pair of reflective surfaces is substantially similar to that of said focussing means.

12. The device of claim 9 in which each of said pair of mirrors is diffraction limited in relation to said focussing means and which the radius of curvature of each of said pair of mirrors is substantially similar to that of said focussing means.

References Cited

UNITED STATES PATENTS

| | | | |
|---|---|---|---|
| 2,380,887 | 7/1945 | Warmisham | 350—200 |
| 2,478,762 | 8/1949 | Johnson | 350—249 |
| 2,585,009 | 2/1952 | Henrofeau | 350—199 |
| 2,684,015 | 7/1954 | Grey | 350—199 |
| 2,868,063 | 1/1959 | Weiss | 350—299 |

OTHER REFERENCES

A Multiple Reflection Optical Lever, H. O. Hoadley, Review of Scientific Instruments, vol. 20, No. 1, January 1949, pp. 30–35.

RONALD L. WIBERT, Primary Examiner

J. ROTHENBERG, Assistant Examiner